INVENTOR.
Ernst R. Bergmann

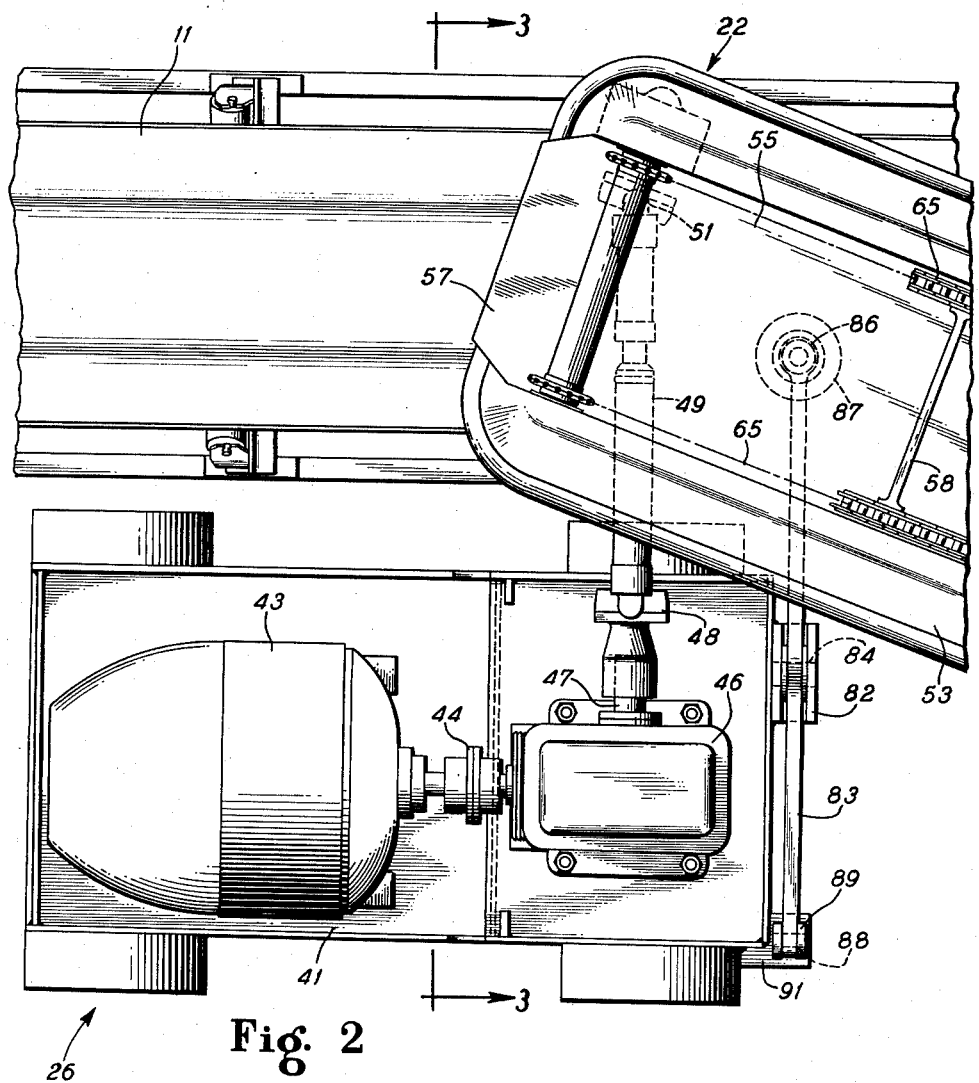

July 9, 1957
E. R. BERGMANN
2,798,587
CASCADE CONVEYOR
Filed March 11, 1954
5 Sheets-Sheet 3
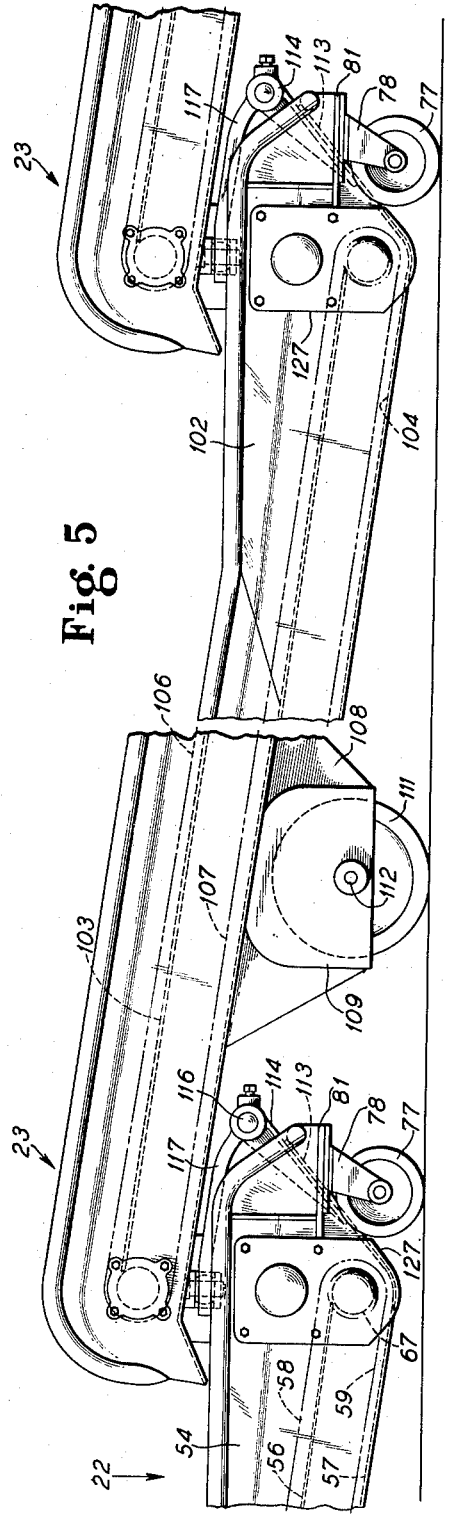
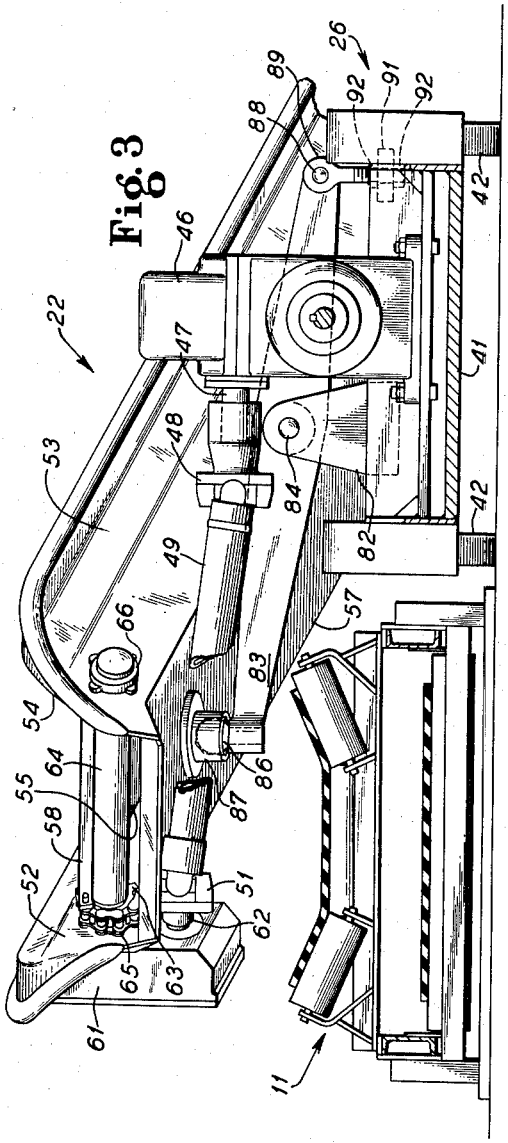
INVENTOR.
Ernst R. Bergmann
BY
Murray J. Gleeson
ATTORNEY July 9, 1957
E. R. BERGMANN
2,798,587
CASCADE CONVEYOR
Filed March 11, 1954
5 Sheets-Sheet 4
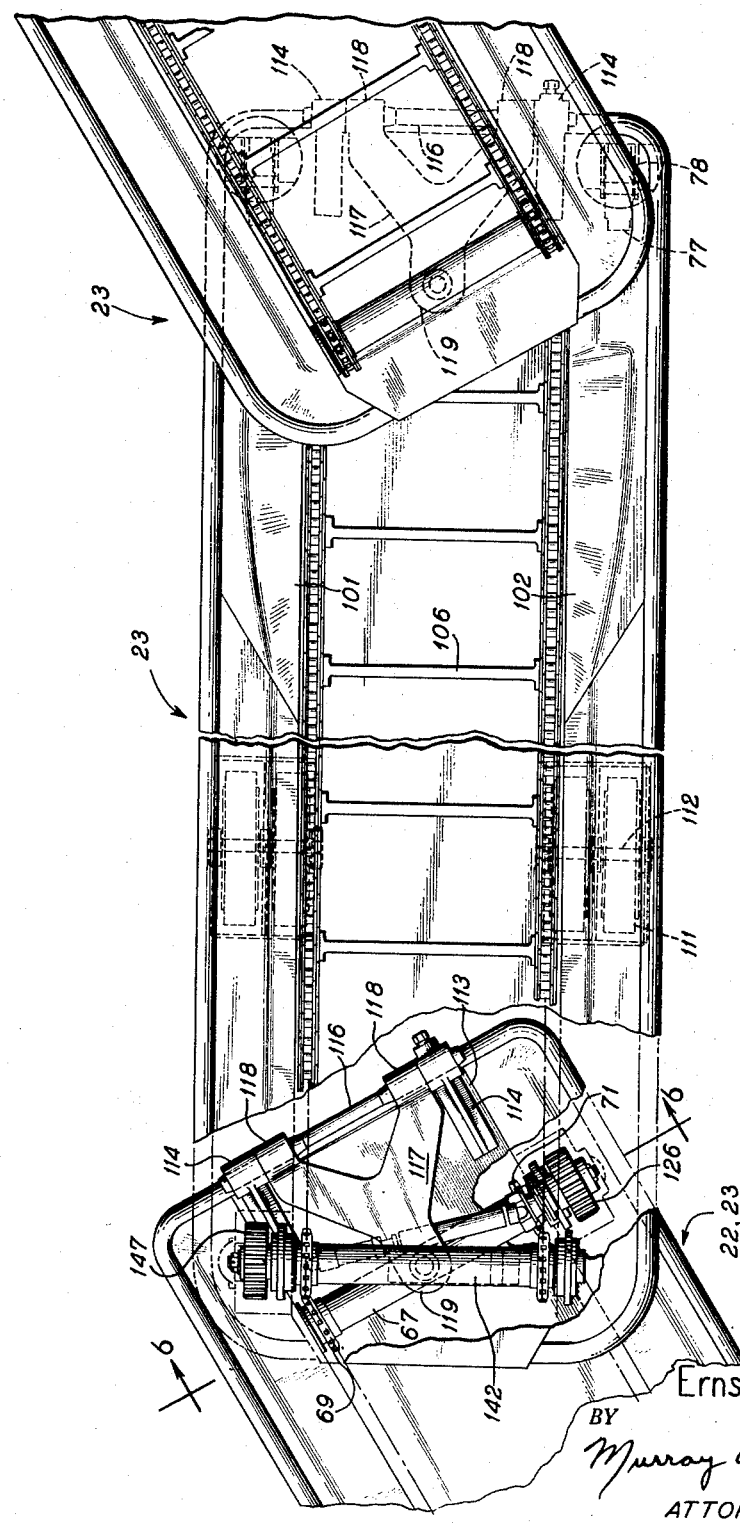
Fig. 4
INVENTOR.
Ernst R. Bergmann
BY
ATTORNEY

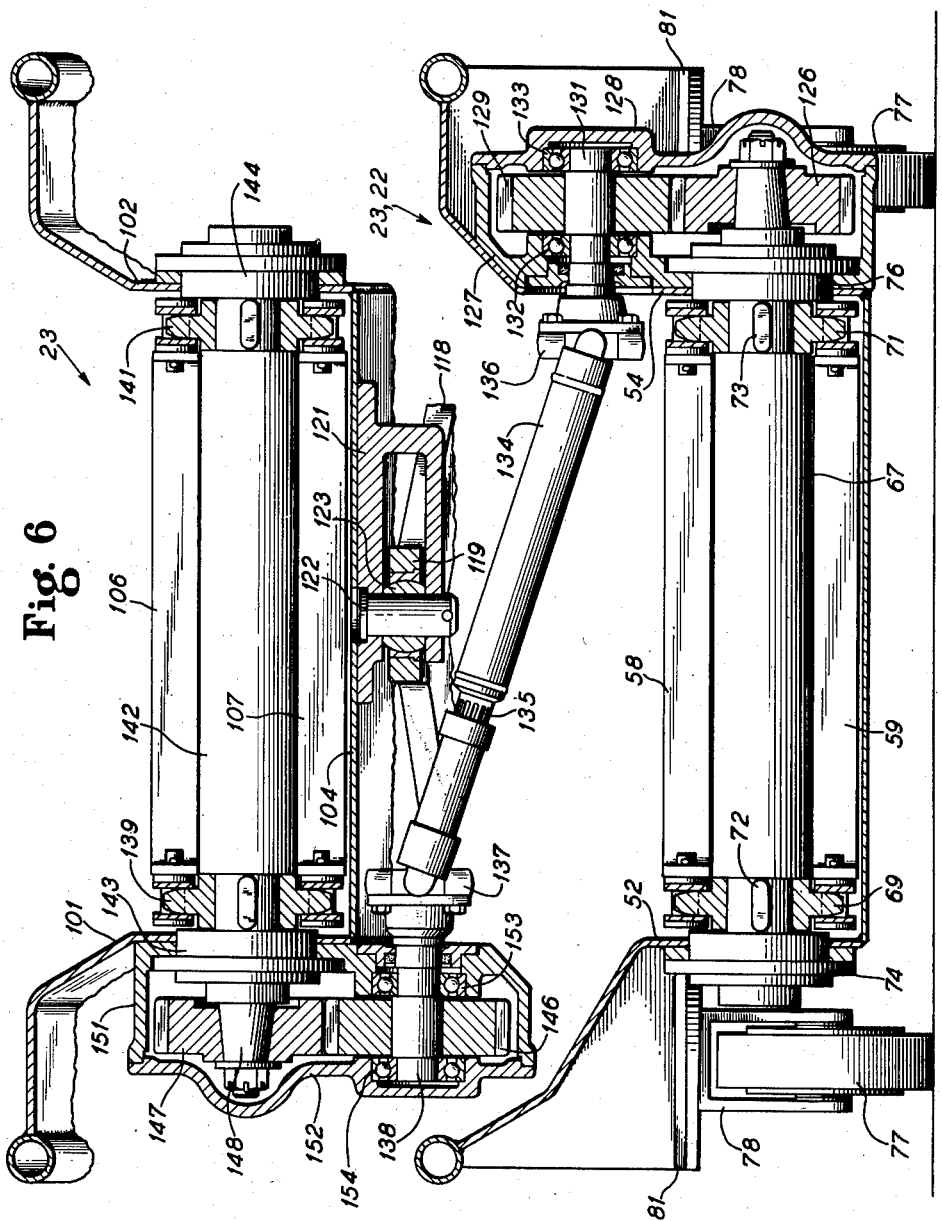

United States Patent Office 2,798,587
Patented July 9, 1957

2,798,587

CASCADE CONVEYOR

Ernst R. Bergmann, Evergreen Park, Ill., assignor to Goodman Manufacturing Company, Chicago, Ill., a corporation of Illinois Application March 11, 1954, Serial No. 415,538

6 Claims. (Cl. 198—82)

This invention relates generally to improvements in machines for mining coal, and relates particularly to improved apparatus for conveying coal away from a continuous miner.

The modern continuous miner is able to remove coal from the solid beam at such a rate as to require a great deal of expensive machinery to serve the miner as it advances into the seam. Consequently all of the advantages gained by the use of such miners is nullified by the expensive equipment necessary to serve the same. Heretofore it has been proposed to move a shuttle conveyor behind the continuous miner and to have such shuttle conveyor discharge on to a cross entry conveyor. Such arrangements require, of course, a shuttle conveyor movable with each such continuous miner.

According to the present invention there is provided an articulated cascading conveyor arranged to receive the cuttings from the continuous miner, and to discharge same upon a gathering conveyor which may be disposed in a room remote from the room in which the miner is operating. Such an articulated cascading conveyor makes unnecessary the use of cross entry conveyors receiving the discharge from each room as the continuous miner advances therein.

Means for driving the cascading conveyor are disposed at the outby end thereof, and such means are arranged to move alongside the gathering conveyor. Each section of the cascading conveyor has an endless chain flight conveyor having means at the inby end thereof for transferring driving effort to the outby end of the next inby conveyor section.

It is a principal object of the invention to provide an improved articulated cascading conveyor, particularly adapted for use behind a mechanical miner, such conveyor having means at the discharge end thereof for driving each of the conveyor sections seriatim from the outby end to the inby end thereof.

This application is a companion one to my co-pending application Ser. No. 415,671, filed March 11, 1954, and now Patent No. 2,722,409, for Apparatus for the Continuous Mining of Coal or the Like.

Other objects and important features of the invention will be apparent from a study of the following specification taken with the drawings which together illustrate a preferred embodiment of the invention and what is now considered to be the best mode of practicing the principles thereof. Other embodiments of the invention will be suggested to those having the benefit of the teachings herein, and it is therefore intended that the scope of the invention not be limited by the precise embodiment herein shown, such other embodiments being intended to be reserved especially as they fall within the scope and purview of the appended claims.

In the drawings:

Fig. 2 is a plan view of the outby end of a cascade conveyor according to the present invention, showing the conveyor in position discharging upon a gathering conveyor, and showing the driving means for the conveyor disposed in position alongside the gathering conveyor;

Fig. 3 is an end view of the discharge end of the cascade conveyor shown in Fig. 2, said view being taken from the left and looking toward the right as seen in Fig. 2;

Fig. 4 is a plan view of one of the intermediate sections of the conveyor shown in Fig. 1, showing details of structure for driving each of the sections;

Fig. 5 is a front elevation view of the intermediate conveyor shown in Fig. 4; and Fig. 6 is a partly elevational and partly sectional view taken along the line 6—6 of Fig. 4 looking in the direction of the arrows, and showing details of structure for affording a driving connection between the sections of the cascade conveyor according to the present invention.

Figure 1:
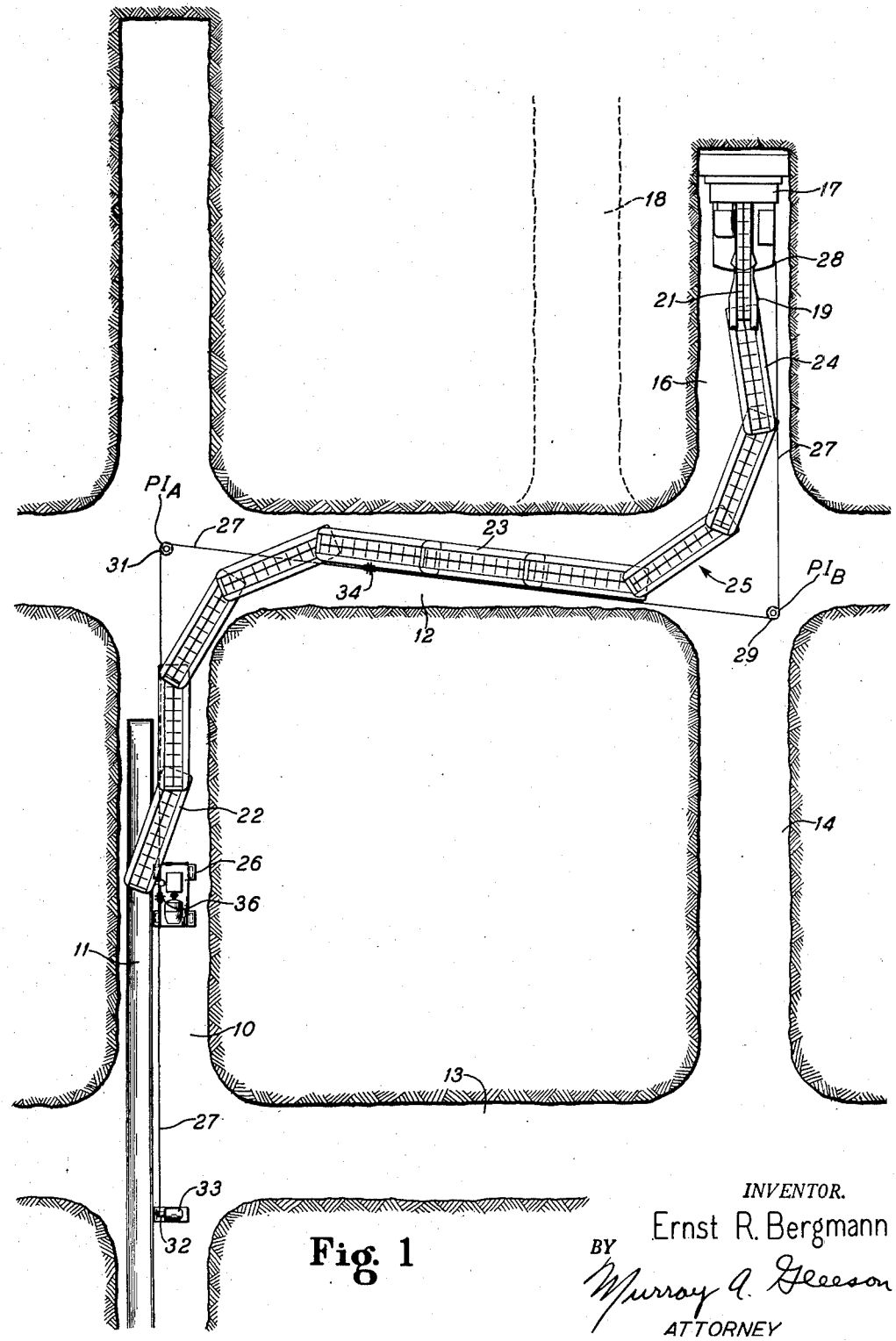
Fig. 1 is a plan view of a portion of a mine showing apparatus according to the present invention operating therein.

Referring now particularly to Fig. 1 of the drawings, there is shown a plan view of a mine wherein the operations are by the room and pillar method, and wherein coal or other mineral is fragmented from a solid seam or vein thereof without the need of explosives by means of a continuous mining machine. Such a mining operation is accomplished by driving an entry 10, within which may be disposed a gathering or mother belt conveyor 11. In the room and pillar system of mining cross entries 12 and 13 are driven from the main entry 10. These cross entries are intersected by rooms 14 and 16 which are driven at convenient distances apart along the cross entry 12 or 13 by a continuous miner referred to generally by the reference numeral 17. For example, there is shown in Fig. 1 room 16 being driven from the cross entry 12. A future room 18 may be driven by the miner 17 upon completion of room 16.

The continuous miner 17 may be of the type which drives multiple contiguous overlapping bores in the solid seam or vein, and may be of the type as shown in an application of Frank Cartlidge, Ser. No. 376,652, filed August 26, 1953, for improvements in continuous miners. Such a machine includes a discharge boom 19 having an endless chain flight conveyor 21 movable longitudinally thereof arranged to discharge the cuttings from the miner 17 onto an articulated cascading conveyor indicated generally by the reference numeral 25. The articulated conveyor 25 is shown as extending into the room 16 behind the continuous miner 17 and along the cross entry 12, further to extend into the main entry 10.

The cascading conveyor 25 has an outby section 22, see also Figs. 2 and 3, arranged to discharge its contents which are received seriatim from intermediate cascading sections 23, so that the outby section 22 discharges onto the mother belt conveyor 11.

Power for driving the outby section 22 and the intermediate sections 23 and an extreme inby section 24 of the cascading conveyor 25 is derived from a power unit 26 arranged to move with respect to the gathering conveyor 11 under conditions which will now be described.

In Fig. 1 the continuous miner 17 is shown as having advanced a considerable distance into the room 16, and during such advance the articulated conveyor 25 advances therewith. The cascade conveyor 25 is accordingly connected to a flexible cable 27 which may be considered as forming a guide for the sections 23 of the cascade conveyors. The conveyor sections 23 are hingedly connected together, as will appear in more detail as this specification proceeds, and move with the cable 27 as the miner 17 is advanced or retracted. By being so connected to the cable 27 the sections of the conveyor describe a "curve" at the intersection of the cross entry 12 and the room 16, and at the intersection of the main entry 10 and the cross entry 12. However, the hingedly connected sections must be controlled in their change of direction in describing the aforementioned curve, and between such "curves" the hinged sections must travel along a tangent. Also, at the ends thereof, where section 24 is moving with the continuous miner 17, it must also describe or move along a tangent. So too, the outby end 22 traveling or moving with respect with the gathering conveyor 11 must also move along a tangent.

To this end the "curve" described by the cascade conveyor 25 in changing in direction from the main entry 10 to the cross entry 12 may be considered as having a point of intersection PI$_A$. Likewise, the "curve" described by the conveyor 25 in changing in direction from cross entry 12 to the room 16 may be considered as having a point of intersection PI$_B$. The flexible cable 27 is anchored at 28 to the continuous miner 17 and is trained around a sheave or shoe 29 having a center common to the point of intersection PI$_B$. The sheave 29 may be part of a roof jacking assembly, not shown, and the details of the support for the sheave 29 form no part of the present invention, and so will not be described in further detail. As seen in Fig. 1, the flexible cable 27 is trained around a similar sheave 31 concentric with the point of intersection PI$_A$, and has its end remote from the mechanical miner 17 wrapped about the winding drum 32 of a power driven winch 33. The flexible cable 27 is fastened as at 34 to one of the intermediate conveyor sections 23 to cause the contiguous sections at such point of connection 34 to travel along the tangent between the points PI$_A$ and PI$_B$. Likewise, the power unit 26 is connected as at 36 to the portion of the cable 27 between the point PI$_A$ and the power winch 33 to cause the power unit 26 to travel along said tangent.

As seen in Fig. 1, as the mechanical miner 17 advances into the room 16, the articulated conveyor 25 advances therewith, since it is connected at point 34 to the flexible cable 27. Continued advance of the miner 17 causes the conveyor unit 23 to the left of the point 34 of connection to the cable 27 to follow the tangent between the points PI$_A$ and PI$_B$. Such continued advance of the miner 17 will cause the conveyor units nearest to the point PI$_B$ to describe what may be considered a smooth "curve," so that the conveyor units do not strike the rib of mineral of the "inside" of such "curves." Similarly, the conveyor units nearest to the point PI$_A$ describe such a "curve," and in so doing are arranged to miss the rib of coal or mineral at the "inside" of such curves.

When the miner has advanced a distance as previously determined or as limited by the length of the articulated conveyor 25, the miner 17 is retracted from its room and moved into the cross entry 12 preparatory to starting an adjoining room such as room 18. Preparatory to such cutting of a new room the articulated unit 25 must be moved by the cable 27 whilst being wound upon the winding drum 33 of the power winch 33. In so doing, the point 34 moves toward the sheave 31, and in order for the individual conveyor units 23 to follow the "curve" shown, and to move along the tangent of the cable 27 between point PI$_A$ and the winch 33, the attaching point 34 must be shifted to successive conveyor units 23.

The power unit 26 which is connected to the cable 27 at the connection point 36 thus moves along the tangent portion 27 between the sheave 31 and the power winch 33, the discharge or outby end 22 of the conveyor 25 moving with the power unit 26 and successive sections 23 along the gathering conveyor 11.

In order to provide retractile movement of the articulated conveyor 25 from a point remote from the winch 33 suitable control means may be provided at the mechanical miner 17.

The general organization of the miner 17, the cable 27, the cascade conveyors 23, 24 and the outby conveyor 22 are claimed in the aforementioned Bergmann application, Ser. No. 415,671.

Referring now particularly to Figs. 2, 3 and 5 of the drawings, the power unit 26 for the conveyor means of both outby unit 22 and the several inby sections 23 will now be described. The gathering conveyor is flanked by the power unit 26 which consists of a frame work 41 arranged to move upon wheels 42, said wheels being secured to the frame in any convenient fashion. The frame 41 supports a driving motor 43 connected through a flexible coupling 44 to a speed reducer 46. An output shaft 47 from the speed reducer 46 is connected through a universal joint 48 to a splined drive shaft 49 having a similar universal joint 51 mounted thereon.

The outby conveyor section 22 as seen in Figs. 2, 3 and 5 consists of a trough 53 having spaced side walls 52 and 54. The spaced side walls 52 and 54 are maintained in spaced relationship by an upper bed plate 56 for the upper or conveying reach 58 of a double chain flight conveyor and a lower bed plate 57 for the lower or return reach 59 of such flight conveyor.

As seen more particularly in Fig. 3, the outer side of the wall 52 is provided with a housing 61 for a gear train, not shown, receiving power from a stub shaft 62 connected to the universal joint 51, and transmitting same to a shaft 64. As seen in Fig. 3, the shaft 64 is journalled in the side wall 54 in a bearing 66, and at the other end in the housing 61. The shaft 64 has keyed thereto spaced sprockets 63 for driving sprocket chains 65 for the upper reach 58 and return reach 59. The two reaches 58 and 59 are reversed in direction about a shaft 67 having sprockets 69 and 71 disposed adjacent the spaced side walls 52 and 54, sprockets 69 and 71 being made fast to the shaft 67 by means of keys 72 and 73 respectively. As seen in Fig. 6 particularly, the ends of the shaft 67 are arranged to be supported within bearings 74 and 76.

The outby conveyor section 22 is arranged to be supported at the inby end thereof upon caster wheels 77 supported in forks 78 arranged to swivel about a vertical axis with respect to a corresponding plate 81 extending beyond one or the other of the spaced walls 52 and 54 at the lower or inby end thereof.

The outby end of the outby conveyor section 22 is supported upon the power unit 26. As seen in Figs. 2 and 3, the power unit 26 is provided at the inby end thereof with a support 82 for a support arm 83 which is connected by a pin 84 to the support 82. The arm 83 terminates in a ball fitting 86 nesting within a socket 87 welded or otherwise secured to the lower plate 57. The opposite end of the arm 83 is held by a pin 88 to a threaded eyebolt 89 passing through an abutment 91 extending from the frame 41. The eyebolt 89 is adjusted in position by means of adjusting nuts 92, thereby adjusting the angular position of the arm 83 and the height of the discharge section 22 above the gathering conveyor 11.

Referring now particularly to Figs. 4, 5 and 6 of the drawings each of the conveyor sections 23 includes spaced side walls 101 and 102. These spaced side walls are welded to an upper bed plate 103 and a lower bed plate 104 forming respectively the path for movement of an upper conveying reach 106 and a lower non-conveying or return reach 107. Each of said conveyor units 23 has extending from the bottom plate 104 thereof spaced vertical plates 108 which together with shrouds 109 form a support for ground engaging wheels 111 turning upon stub axles 112 held at each end in vertical plates 108 and shrouds 109.

The opposite ends of each of the sections 23 are supported upon caster wheels 77, similar to those of section 22, and arranged to swivel about a substantially vertical axis in a fork 78 pivoted to the support plate 81.

The several conveyor sections 23 are arranged to pivot in a horizontal plane and also in a vertical plane with respect to the adjoining outby section so that the entire cascade conveyor 25 may follow undulations in the mine floor and may also follow the "curve" previously described. To this end the bottom plate 57 of the outby section 22 and the bottom plate 104 of each of the inby sections 23 is flared upward as at 113 to extend between the flared sides 52 and 54 or 101 and 102 at the inby ends of the respective conveyor sections 22 and 23.

The plate 113 has welded thereto spaced pillow blocks 114 on the inner side thereof. Said pillow blocks support a pin 116, see also Fig. 4, to which is hingedly supported a coupler 117 generally of a Y-configuration with arms 118 engaging the pin 116 and abutting the pillow blocks 114. The coupler 117 has a tongue 119, see also Fig. 6, which extends between the arms of a clevis 121 welded to the underside of the bed plate 104 at the outby end of the conveyor section 23. Said clevis supports a pin 122 encompassed by a ball joint 123 supported in the tongue 119 of the coupler 117.

Since the coupler 117 is freely swivelable in a vertical plane with respect to both the adjacent inby and outby sections, and is swivelable in a horizontal plane with respect to the outby section, it will be apparent that the two contiguous sections 23 are thus universally connected.

Means are provided for transmitting power from the outby section 22 to its next adjacent inby section 23 for all positions of articulation thereof so as to drive seriatim the conveying means of each section. The inby end of each section 23, as is also the inby end of the outby discharge section 22, is provided with means to transfer or transmit such power for driving each conveyor means as will now be described. Reference will be had to the means at the inby end of the discharge section 22, and it is believed that it will be obvious to those skilled in the art that each of the sections 23 is likewise so constructed.

To this end each of the sections 23 is provided with a pinion 126 mounted at the end of the shaft 67 at the inby end thereof. Said pinion 126 is held within a housing 127 disposed on the outer side of the side wall 54. Said housing 127 has a closure 128 which provides a support together with the housing 127 for a pinion 129 meshing with the pinion 126. Pinion 129 is made fast to a shaft 131 supported on bearings 132 in the housing 127 and on a bearing 133 held in the closure 128. The shaft 131 is connected to a shaft 134 through a universal joint 136. The shaft 134 is made extensible and contractable by means of a spline 135 and is connected also to a universal joint 137 mounted on a shaft 138.

As seen in Fig. 6, the flight conveyor of each section 23 is driven at the outby end thereof by sprockets 139 and 141 fast to a shaft 142. Said shaft is held on bearings 143 and 144 mounted respectively in the walls 101 and 102 of each conveyor section 23. The shaft 142 and its sprockets 139 and 141 are driven through the medium of a pair of mating gears 146 and 147, gear 147 being made fast to an extension 148 of the shaft 142. The gears 146 and 147 turn within a housing 151 secured to the outer side of the wall 101, said housing having a closure 152. The shaft 138 is supported on a bearing 153 in the housing 151 and upon a similar bearing 154 in the closure 152.

It is believed apparent to thos skilled in the art that the outby section can thus transmit power to drive the flight conveyor in the next inby section through the means just described. Depending upon the amount of articulation of the two adjacent sections with respect to each other the splined shaft 134 lengthens or contracts accordingly.

The cascade conveyor 25 may accordingly be made as long as desired in accordance with operating conditions, consistent with the amount of power produced by the driving motor 43 located on the power unit 26.

As has been described, the cascade conveyor which is freely swivelable in both vertical and horizontal directions is able to describe the "curves" when the rooms being driven by the miner 17 are not on the same center line as the center line of the entry in which the conveyor 11 is operating. It is believed apparent that the apparatus described herein enables a large number of rooms to be made without the need of a large number setups of the mother conveyor as has been necessary heretofore.

While the invention has been described in terms of an embodiment which will assume in practice the scope thereof is not intended to be limited by the precise embodiment herein shown, such other embodiments being intended to be reserved especially as they fall within the term of the claims here appended.

I claim as my invention:

1. A cascade conveyor comprising individual conveyor sections each having an endless conveyor extending longitudinally thereof, ground engaging means for each of said sections whereby each of said sections may be moved readily over a mine floor or the like, means for connecting said sections so as to articulate in both horizontal and vertical planes, comprising a coupler disposed below the outby end of one conveyor section and above the inby end of an adjacent section, said coupler having a connection at said inby end swivable in one plane and having a further connection at said outby end swivelable in a different plane, and means for transmitting power from one of said conveyor sections to a contiguous section to drive the conveyor of such contiguous section comprising a power take off from one end and one side of each of said sections to an opposite end and an opposite side of a contiguous section, said take off including a connecting shaft with universal joints at each end thereof, said shaft being extensible and contractable in accordance with the amount of articulation of said contiguous sections, said take off being disposed beneath the outby end of one conveyor section and above the inby end of an adjacent section.

2. A cascade conveyor comprising individual conveyor sections each having an endless flight conveyor extending longitudinally thereof, ground engaging means for each of said sections whereby each of said sections may be moved readily over a mine floor or the like, means for connecting said sections so as to articulate in both horizontal and vertical planes, comprising a coupler disposed below the outby end of one conveyor section and above the inby end of an adjacent section, said coupler having a connection at said inby end swivelable in one plane and having a further connection at said outby end swivelable in a different plane, means for transmitting power from one of said conveyor sections to a contiguous section to drive the flight conveyor of such contiguous section comprising a power take off from one end and one side of each of said sections to an opposite end and an opposite side of a contiguous section, said power take off including a pair of universal connections which transmit power through an angle which is one-half the angle between adjacent sections, said take off being disposed beneath the outby end of one conveyor section and above the inby end of an adjacent section.

3. A cascade conveyor comprising individual conveyor sections each having an endless conveyor extending longitudinally thereof, ground engaging means for each of said sections whereby each of said sections may be moved readily over a mine floor or the like, means for connecting said sections so as to articulate in both horizontal and vertical planes, comprising a coupler disposed below the outby end of one conveyor section and above the inby end of an adjacent section, said coupler having a connection at said inby end swivelable in one plane and having a further connection at said outby end swivelable in a different plane, an outby unit in position over a gathering conveyor, a motor mounted on said last named means including a connection from said motor to the conveyor of said outby section, and means for driving the inby sections seriatim from the outby section comprising means for transmitting power from one of said conveyor sections to a contiguous section to drive the conveyor of such contiguous section comprising a power take off from one end and one side of each of said sections to an opposite end and an opposite side of a contiguous section, said take off being disposed beneath the outby end of one conveyor section and above the inby end of an adjacent section.

4. A cascade conveyor comprising individual conveyor sections each having an endless flight conveyor extending longitudinally thereof, ground engaging means for each of said sections whereby each of said sections may be moved readily over a mine floor or the like, said ground engaging means consisting of at least one wheel whereby an individual section may be steered along such mine floor, means for connecting said sections so as to articulate in both horizontal and vertical planes, comprising a coupler disposed below the outby end of one conveyor section and above the inby end of an adjacent section, said coupler having a connection at said inby end swivelable in one plane and having a further connection at said outby end swivelable in a different plane, and means for transmitting power from one of said conveyor sections to a contiguous section to drive the flight conveyor of such contiguous section, said power transmitting means including a pair of universal connections from one side and one end of one section to an opposite side of a contiguous section, said take off being disposed beneath the outby end of one conveyor section and above the inby end of an adjacent section.

5. A cascade conveyor comprising individual conveyor sections each having an endless flight conveyor extending longitudinally thereof, ground engaging means for each of said sections whereby each of said sections may be moved readily over a mine floor or the like, means for connecting said sections so as to articulate in both horizontal and vertical planes, comprising a coupler disposed below the outby end of one conveyor section and above the inby end of an adjacent section, said coupler having a connection at said inby end swivelable in one plane and having a further connection at said outby end swivelable in a different plane, and means for transmitting power from one end and one side of said conveyor sections to the opposite end and the opposite side of a contiguous section to drive the flight conveyor of such contiguous section, said means including a shaft which is inclined to each section by an angle equal to one-half the angle between contiguous sections, said last named means being disposed beneath the outby end of one conveyor section and above the inby end of an adjacent conveyor section.

6. A cascade conveyor comprising individual conveyor sections each having an endless conveyor extending longitudinally thereof, ground engaging means for each of said sections whereby each of said sections may be moved readily over a mine floor or the like, means for connecting said sections so as to articulate in both horizontal and vertical planes comprising a coupler disposed below the outby end of one conveyor section and above the inby end of an adjacent section, said coupler having a connection at said inby end swivelable in one plane and having a further connection at said outby end swivelable in a different plane, and means for transmitting power from one end and one side of said conveyor sections to the opposite end and the opposite side of a contiguous section to drive the conveyor of such contiguous section, said means including a shaft which is inclined to each section by an angle equal to one-half the angle between contiguous sections, said last named means being disposed beneath the outby end of one conveyor section and above the inby end of an adjacent conveyor section.

References Cited in the file of this patent

UNITED STATES PATENTS

| | | |
|---|---|---|
| 771,746 | Peters | Oct. 4, 1904 |
| 1,245,168 | Wright | Nov. 6, 1917 |
| 1,338,727 | Gretencord | May 4, 1920 |
| 1,818,168 | Smith | Aug. 11, 1931 |
| 2,420,009 | Osgood | May 6, 1947 |
| 2,422,268 | Symonds | June 17, 1947 |

FOREIGN PATENTS

| | | |
|---|---|---|
| 367,645 | France | May 22, 1908 |